Figure 1:
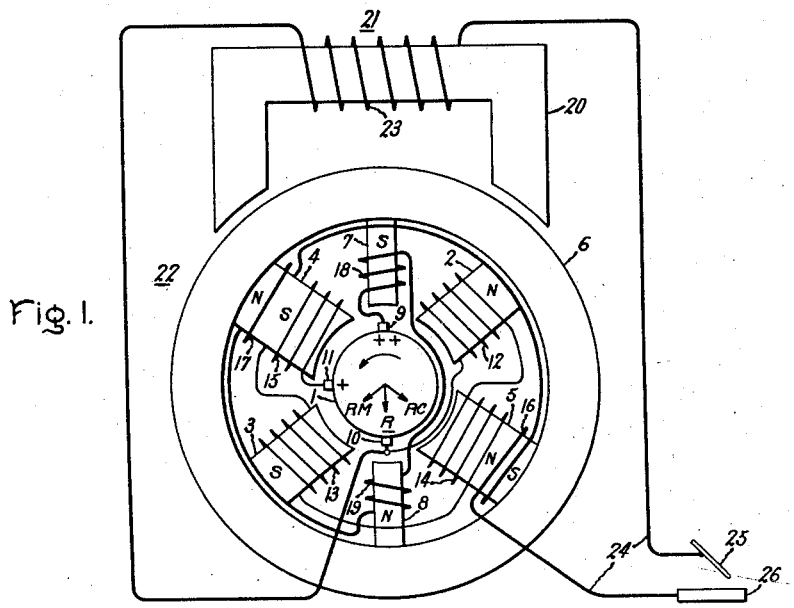

July 31, 1945.    C. M. WHEELER    2,380,813
ELECTRIC APPARATUS
Filed Oct. 28, 1944    2 Sheets-Sheet 1

Inventor:
Charles M. Wheeler,
by Harry E. Dunham
His Attorney.

July 31, 1945.　　　　C. M. WHEELER　　　　2,380,813
ELECTRIC APPARATUS
Filed Oct. 28, 1944　　　　2 Sheets-Sheet 2
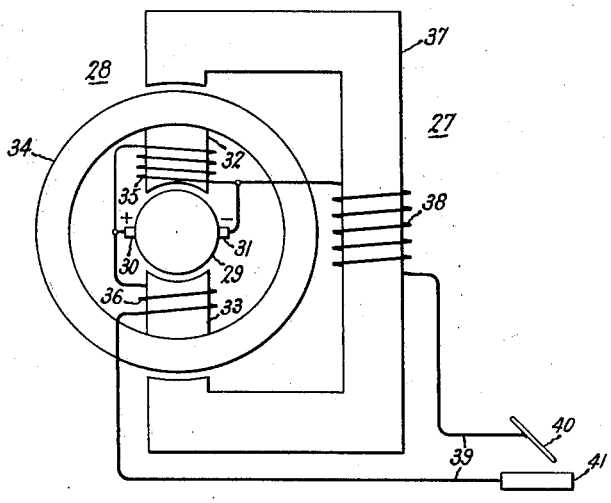
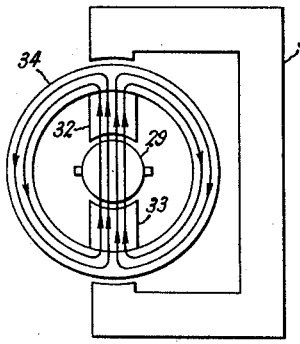 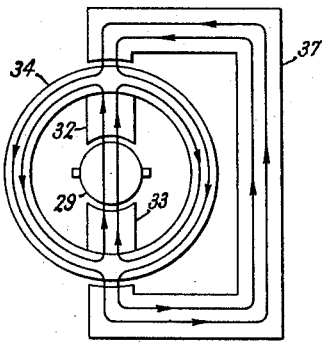 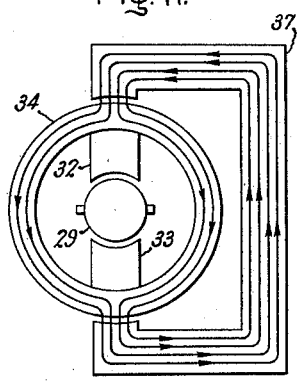
Inventor:
Charles M. Wheeler,
by Harry E. Dunham
His Attorney.

Patented July 31, 1945

2,380,813

UNITED STATES PATENT OFFICE 2,380,813

ELECTRIC APPARATUS

Charles M. Wheeler, Lynn, Mass., assignor to General Electric Company, a corporation of New York Application October 28, 1944, Serial No. 560,782

13 Claims. (Cl. 171—312)

My invention relates to electric apparatus for supplying loads at variable voltage. It is particularly applicable to dynamoelectric machines which supply electrical energy for arc welding. Such dynamoelectric machines are commonly referred to as arc welding generators.

The welding arc is quite unstable as a load because of its negative resistance characteristic. Consequently it cannot be supplied from a constant potential source without connecting in circuit therewith a suitable stabilizing means such as a resistance. The use of such a ballasting resistance is however quite wasteful of energy and consequently arc welding generators have been developed to have characteristics like or similar to that produced by a constant potential generator in combination with a ballast resistance. Such generators have a drooping volt-ampere characteristic; that is, their voltage drops rapidly with increasing current.

Generators having this desired drooping volt-ampere characteristic as determined by static load conditions are, however, not entirely satisfactory unless they perform in accordance with this characteristic during periods of readjustment of load current flow. In other words, their transient or dynamic performance is of great importance and may not be satisfactory because of the inertia to flux changes in their field magnet structures.

The performance of arc welding generators having the desired static volt-ampered characteristic have been improved by connecting stabilizing reactors in their arc welding circuit. The purpose of such reactors is to store energy when there is an excess from the generator and to return energy to the circuit when the generator is incapable of supplying a deficiency of energy. The action of the reactor is therefore analogous to that of a flywheel on a moving mechanism. By action of the energy stored in its inductance, the reactor helps to smooth out current fluctuations in the arc welding circuit.

It is an object of my invention to provide an improved reactor-generator arrangement in which the flux of the reactor is completed through the field magnet structure of the welding generator with which it is associated so as to improve the transient or dynamic performance of the generator while at the same time securing the desired value of stabilizing inductance in circuit therewith.

It is a further object of my invention to associate the magnetic circuits of a reactor and a dynamoelectric machine in such manner as to obtain a substantially constant flux condition in all or a part of the frame of the magnetic field structure of the dynamoelectric machine and thereby improve its dynamic operating characteristics.

It is another object of my invention to reduce the size and weight of a reactor having the desired stabilizing inductance for the dynamoelectric machine with which it is associated by completing the magnetic circuit of the reactor through the field magnet structure of the dynamoelectric machine.

It is also an object of my invention to provide an arrangement in which that portion of the field magnet structure of a dynamoelectric machine spanned by the reactor is formed of solid material without any impairment of the dynamic performance of the dynamoelectric machine resulting therefrom.

Further objects of my invention will become apparent from the embodiments thereof illustrated in the accompanying drawings.

Figure 2:
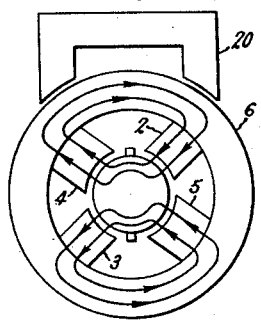
Figure 3:
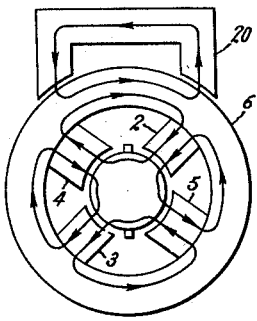
Figure 4:
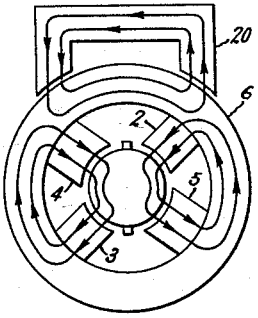

In Fig. 1 of these drawings my invention has been illustrated as applied to a split-pole dynamoelectric machine in which a substantially constant flux condition has been obtained in that portion of its frame between poles of unlike polarity by completing therethrough the magnetic circuit of a reactor having a winding connected for energization in accordance with changes in load current in the dynamoelectric machine. In such an arrangement the flux conditions resulting from the combination illustrated is as illustrated in Figs. 2, 3, and 4 for no load, full load, and short circuit conditions. In accordance with a variation of the embodiment shown in Fig. 1 the reactor may be positioned to span that portion of the dynamoelectric machine between poles of like polarity, and I have consequently illustrated in Figs. 5, 6, and 7 flux conditions obtained with such a placement of the reactor for no load, full load, and short circuit conditions. In Fig. 8 I have diagrammatically illustrated my invention as applied to a dynamoelectric machine of the differentially compound type and have illustrated in Figs. 9, 10, and 11 flux conditions in the core of the reactor and in the field magnet structure of the dynamoelectric machine at no load, full load, and short circuit conditions.

As illustrated in the drawings, apparatus embodying my invention comprises a dynamoelectric machine having a field magnet structure including pole pieces of magnetic material connected by a section of magnetic material in which there is a flux change produced by a change of load current in the dynamoelectric machine and means for maintaining a substantially constant flux condition in this section of the field magnet structure of the dynamoelectric machine. This desired result is obtained by associating with the dynamoelectric machine a reactor whose core of magnetic material spans the field magnet structure of the dynamoelectric machine between adjacent pole pieces thereof and whose core winding is connected for energization in accordance with changes in load current in the dynamoelectric machine. Preferably the ends of the core of the reactor are spaced from the field magnet structure of the dynamoelectric machine to provide air gaps in its magnetic circuit.

Since in accordance with my invention there is substantially no readjustment of flux in the portion of the field magnet structure of the dynamoelectric machine spanned by the reactor, the transient or dynamic performance of the machine is improved by reason of the elimination of the retarding effects of hysteresis losses and eddy currents which would otherwise occur due to flux changes in this portion of the field magnet structure of the dynamoelectric machine. Consequently the restriking voltage of the dynamoelectric machine will be increased and more speedily obtained and current surges will be minimized in proportion to the portion of the field magnet structure of the dynamoelectric machine spanned by the core of the reactor.

By using the field magnet structure of the dynamoelectric machine for carrying reactor flux the weight of the magnetic material required for the reactor is considerably reduced and the reactor may consequently be smaller and lighter than heretofore used. Furthermore since in accordance with my invention there is substantially no flux change in the field magnet structure of the dynamoelectric machine spanned by the reactor core, the transient or dynamic characteristics of the machine will not be impaired if that portion of the field magnet structure of the dynamoelectric machine is made of solid material. Consequently in accordance with my invention only those portions of the field magnet structure of the dynamoelectric machine in which there is a flux change with a change in load current need be formed of laminated magnetic material.

The variable voltage generator diagrammatically illustrated in Fig. 1 of the drawings is of the split-pole type disclosed in United States Letters Patent 1,340,004 Sven R. Bergman, granted May 11, 1920.

The armature 1 of this generator is provided with an armature winding wound for two poles, and a two-pole field magnet structure comprises four mechanical poles 2, 3, 4, and 5 supported on a frame 6. Pole pieces 2, 3, 4, and 5 of this generator are paired in groups of the same polarity as indicated by N and S applied thereto. Thus there is a group of two north poles 2 and 5 followed by a group of two south poles 3 and 4. Pole pieces 2 and 3 constitute a set of main pole pieces distributed about armature 1 of the machine, and pole pieces 5 and 4 constitute a set of cross pole pieces likewise distributed about armature 1 of the machine and located intermediate main pole pieces 2 and 3. For the purpose of obtaining good commutation, commutating pole pieces 7 and 8 are also provided. These pole pieces are also mounted on frame 6 of the generator.

The armature, pole pieces, and frame of the generator are formed of magnetic material. This magnetic material is laminated in order to reduce eddy current losses and thereby improve the dynamic or transient performance of the machine. Of course, as will be pointed out below, all or certain portions of the frame of the generator may be formed of solid material in view of the fact that when employing my invention there is no flux change therein with changes of generator load current.

Main pole pieces 2 and 3 are constructed and arranged to be saturated so that the flux therein is unaffected by armature reaction, and cross pole pieces 5 and 4 are constructed and arranged to be unsaturated so that the flux therein is varied by armature reaction. The fluxes of these two sets of pole pieces are displaced 90 electrical degrees from each other, and the flux through the main pole pieces will be identified as the main flux and the flux through the cross pole pieces as the cross flux of the two-pole field magnet structure of this generator.

The load current in the armature winding of this generator is taken from two main brushes 9 and 10 located in neutral positions on a commutator connected with this winding. In addition to these main brushes there is also an auxiliary brush 11 for supplying exciting current to the shunt field windings on the main and cross pole pieces of the generator. This auxiliary brush engages the commutator of the machine at a point intermediate main brushes 9 and 10.

The generator is self-excited, the excitation for the field winding 12, 13 for main pole pieces 2 and 3, and the exciting winding 14, 15 for cross pole pieces 5 and 4 being taken across brushes 11 and 10 as shown in the drawings. Cross pole pieces 5 and 4 are also provided with series field windings 16 and 17, and commutating pole pieces 7 and 8 are provided with series windings 18 and 19 connected in circuit with the armature winding of the generator through load brushes 9 and 10 thereof. These several windings produce in the pole pieces with which they are associated field fluxes directed in accordance with the polar identifications applied thereto by the letters N and S which respectively signify north and south polar excitation.

As previously stated, the magnetic circuit through main pole pieces 2 and 3 of the generator is so designed that magnetic saturation exists therein, whereas cross pole pieces 5 and 4 are designed for operation without saturation. As soon as the generator is loaded, current flow through its armature winding produces an armature reaction R which may be resolved into two components, one RM in the direction of the main flux of pole pieces 2, 3, and the other RC in opposition to the cross flux of pole pieces 5, 4. Since the magnetic circuit through main pole pieces 2, 3 is saturated, component RM of this armature reaction cannot force additional flux through this circuit and the main flux consequently remains practically constant. Component RC of the armature reaction, however, neutralizes the cross flux through pole pieces 5, 4 which thus decreases as load current increases. This effect of armature reaction is increased by series field windings 16 and 17 on cross pole pieces 5 and 4.

The voltage of the dynamoelectric machine across its main brushes 9, 10 is the algebraic sum of its voltages between brushes 9, 11 and 11, 10. The voltage 11, 10 is induced by the main flux of main pole pieces 2, 3 and remains practically constant since the main flux is constant and the speed of the machine is maintained constant. The voltage 9, 11, however, decreases with increasing load current in the armature winding and series field windings 16 and 17 of the generator since, as previously stated, the cross flux through pole pieces 5, 4 decreases under these conditions. As a matter of fact, the cross flux passes through zero and is finally reversed.

As pointed out in the Bergman patent above referred to, series field windings 16, 17 may be omitted or may include a plurality of turns which may be selectively placed in the load circuit in order to obtain desired ranges of current flow suitable for a number of different welding operations for which the generator may be used. Obviously a field rheostat may be placed in circuit with the shunt field windings of the generator in order to secure a closer adjustment of the welding current flow than that provided by controlling the effective number of series field winding turns. The diagram of Fig. 1 has not been complicated by illustrating these details which are obvious and have been used in practicing the invention of the above identified Bergman patent.

The change of flux in cross pole pieces 5 and 4 of the split-pole generator above described, with changes of load current supplied thereby, produces a flux change in frame 6 of the generator. Thus in the portion of the frame between pole pieces 2 and 5 the flux will increase from zero to a full flux condition between zero and short circuit current, whereas the flux in the portion of the frame between pole pieces 2 and 4 will change from a full flux condition to zero flux between zero and sort circuit current. This change in flux condition in the frame of the generator is accompanied by hysteresis and eddy current losses which slow up its response to changes in load current.

In accordance with my invention a reactor or a plurality of reactors used to stabilize current flow in the welding circuit of the generator is or are employed for improving the dynamic characteristics of the generator by preventing a flux change in all or a portion of the supporting frame for the pole pieces of the generator. In a machine such as illustrated in Fig. 1, to secure full advantage of my invention it would be necessary to employ four reactors. Partial improvement and a full understanding of my invention will, however, be apparent from a consideration of the arrangement illustrated in Fig. 1 in which a single reactor is used.

As shown in Fig. 1 of the drawings, the core 20 of a reactor 21 spans the outer periphery of field magnet frame 6 of generator 22 between adjacent pole pieces 2 and 4 thereof and is provided with a winding 23 connected in series circuit with the armature winding of the generator for current flow therethrough in a direction to establish a flux in the field magnet structure of the generator between pole pieces 2 and 4 which is in the same direction as that produced by the exciting windings of the generator. The arrangement is such that the reactor supplies through its magnetic circuit, which is completed in part through frame 6 of the generator between pole pieces 2 and 4, a flux which maintains substantially constant the flux condition in frame 6 between these pole pieces of the generator.

Core 20 of reactor 21 is formed of magnetic material and is preferably laminated to reduce eddy current losses. It may be supported on frame 6 of generator 22 and its ends may be spaced therefrom to secure any desired air gap in its magnetic circuit which is completed through this frame.

As in the prior practice, reactor 21 is connected in series with the welding circuit 24 which constitutes the load circuit of generator 22. One terminal of this welding circuit is connected to an arc welding electrode 25 and its other terminal is connected to the work 26.

The flux conditions in the combined generator and reactor of Fig. 1 have been diagrammatically illustrated in Figs. 2, 3 and 4 for open circuit, normal load, and short circuit current flow in the generator. It will be noted that for a given load adjustment of the generator the flux change in the section of its frame 6 spanned by reactor core 20 when going from open circuit to short circuit or from short circuit to open circuit is zero. This enhances the dynamic characteristics of the generator by speeding and increasing its restriking voltage and minimizing current surges on short circuit.

The gain in dynamic performance of the generator lies in the constancy of flux through the section of its frame spanned by the reactor. By referring to Figs. 2 and 4 it will be noted that ordinarily it is necessary for an immediate readjustment of flux to take place in that portion of frame 6 of the generator spanned by reactor core 20 when the welding terminals are suddenly short circuited or suddenly opened from a short circuit condition. It is this immediate readjustment of flux which establishes the restriking voltage of the generator. This readjustment in fluxes is slowed down considerably if the magnet frame of the generator is solid and to a lesser degree if it is laminated due to the retarding effect of hysteresis losses and eddy currents therein. This results in both a lower striking voltage and a lower recovery to normal open circuit voltage. However, if the reactor establishes on short circuit the same flux in the frame of the generator spanned by the reactor core that must exist after the generator circuit is broken, then the restriking voltage of the generator will be improved in proportion to the portion of its frame spanned by the reactor. Transient sort circuit peak circuits are reduced in magnitude for exactly the same reason that restriking voltage is increased. That is, the reactor establishes the same flux in the frame of the generator spanned by the reactor core at short circuit that existed on open circuit an instant before.

The reactor, of course, finds its optimum operation only at one setting of the field controls of the generator. Consequently the reactor is designed for optimum operation at that setting which gives poorest welding performance. Obviously at very low currents it will be necessary to reduce the air gap of the reactor core in order to obtain optimum operation. Conversely it will be necessary to increase the reactor's air gap to obtain optimum operation at setting higher than that for which the reactor was designed for optimum operation.

At this point it may be pointed out that the dynamic performance of the generator reactor set will not be jeopardized if that portion of the generator frame spanned by the reactor core is made of solid material. There being little or no flux change in this portion of the frame of the generator, there is consequently little or no hysteresis or eddy current losses and lamination thereof is unnecessary.

Figure 5:
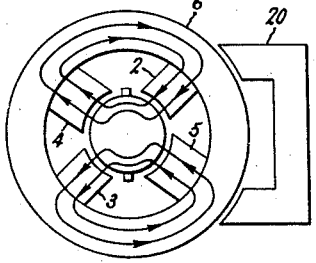
Figure 6:
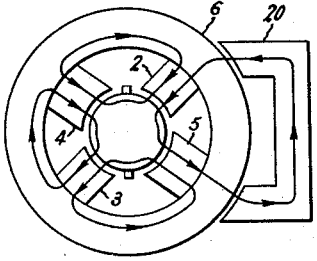
Figure 7:
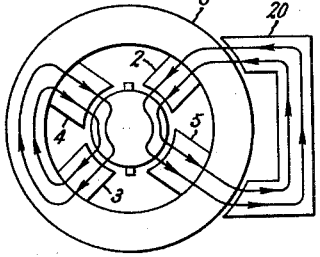

Reactor 21 may be mounted relative to generator 22 so that its core 20 spans that portion of its magnet frame 6 between main and cross poles 2, 5 or 3, 4 which are of the same polarity instead of spanning main and cross poles 2, 4 or 3, 5 of opposite polarity, as in the consideration above given. Figs. 5, 6, and 7 diagrammatically illustrate flux conditions in the apparatus when employing a side mounting of the reactor. It will be noted that the only difference in the analysis of the manner in which dynamic performance is improved, is that the reactor maintains zero flux instead of full flux through that section of the generator frame 6 spanned by reactor core 20.

It will be observed that flux linkages with the field coils of the generator on open circuit and steady state short circuit as indicated in Figs. 2, 4 and Figs. 5, 7 are not altered by the position of the reactor. It follows consequently that the static characteristics of the welding generator have not been changed by reason of the addition of the reactor.

In view of the above analysis of my invention, it is apparent that it may be applied to a welding generator of a different design in which field fluxes are required to change in magnitude with changes of load current in the generator during welding. For example, it may be applied to a differentially compound generator in the manner diagrammatically illustrated in Fig. 8. In such case the reactor is associated with the frame of the generator in such manner that it maintains practically constant flux in those portions of the frame spanned thereby.

In the arrangement shown in Fig. 8 reactor 27 has been associated with a dynamoelectric machine 28, which is of the shunt excited, differentially compounded type. This generator is provided with an armature 29 having an armature winding which is connected to its load circuit through brushes 30 and 31 engaging the commutator of its armature winding. The field magnet structure of this generator comprises main pole pieces 32 and 33 distributed about the exterior of its armature 29 and mounted on the interior of a frame 34 forming part of the field magnet structure of the generator. A separately excited shunt field winding 35 is mounted on pole piece 32, and a differential series field winding 36 is mounted on its pole piece 33. Winding 32 is connected across brushes 30 and 31 of the generator, and winding 36 is connected in series circuit with these brushes and the armature winding of the generator.

Reactor 27 is provided with a core 37 which spans the sections of generator frame 34 between its pole pieces 32 and 33 and with a series winding 38 which is connected in circuit with load brushes 30 and 31 of the generator and the welding circuit 39 supplied by the generator through these load brushes. One terminal of the load circuit is connected to an arc welding electrode 40 and its other terminal is connected to the work 41.

In a generator of the type just described, its frame 34 is required to carry full flux at no load and for all practical purposes zero flux at short circuit. This consequently results in a flux change in the frame which is productive of the same hysteresis and eddy current losses above considered in connection with the embodiment illustrated in Fig. 1. By using reactor 27, however, in the manner illustrated in Fig. 8, flux changes in the frame of the generator may be eliminated. This will become apparent from the analysis presented in the diagrams of Figs. 9, 10, and 11 which illustrate flux conditions in the frame of the generator and in the core of the reactor at no load, full load, and short circuit current flow in the generator. It will be noted that the decrease in flux in the frame of the generator is supplemented by flux from the reactor so that there is no flux change in the frame of the generator. Thus, as in the case considered for the embodiment of my invention illustrated in Fig. 1, the dynamic characteristics of the generator are enhanced by speeding and increasing its restriking voltage and minimizing current surges when the generator is short circuited. In the arrangement illustrated in Fig. 8, for reasons previously noted, frame 34 may be made of solid material. Core 37 of the reactor, however, is preferably of laminated construction.

In view of the above description and explanation of my invention, other applications will occur to those skilled in the art. For example, split-pole generators of a design differing from that illustrated in Fig. 1 of the drawings may have a reactor core associated therewith in accordance with my invention to obtain the advantages described above. Furthermore the differential compound generator illustrated in Fig. 8 may be variously modified. It may be provided with a separately excited winding instead of the self-excited winding illustrated, or a separately excited winding may be used in addition to the shunt excited winding illustrated. Furthermore the windings may be distributed equally between the pole pieces and more than two main pole pieces may be used. Commutating and compensating windings and pole pieces therefor may also be used. It is also apparent that depending upon the structure of the generator other arrangements of the magnetic circuits of the generator and reactor than those illustrated may be made without departing from my invention.

Although I have described my invention in connection with arc welding generators, it is to be understood that my invention is not limited to generators of this type but is applicable to other generators supplying variable loads. Furthermore it is apparent that the principles involved are equally applicable to motors having flux changes in their field magnet structures with changes in fluctuating load current supplied thereto. I have consequently identified such generators and motors in the claims appended hereto as dynamoelectric machines.

Various other arrangements embodying my invention will occur to those skilled in the art, and I intend consequently to cover by the appended claims all such modifications and variations which come within the true spirit and scope of my invention.

What I claim as new and desire to secure by Letters Patent of the United States, is:

1. Apparatus comprising a dynamoelectric machine and a reactor having a common magnetic circuit, said dynamoelectric machine having an armature, an armature winding, and a magnetic field structure including pole pieces of magnetic material distributed about said armature of said dynamoelectric machine and connected by a frame of magnetic material which completes the magnetic circuit through said pole pieces, and said reactor having a magnetic core spanning said frame of said dynamoelectric machine and a coil on said core connected in series circuit with the armature winding of said dynamoelectric machine.

2. Apparatus comprising a dynamoelectric machine having a field magnet structure including pole pieces of magnetic material connected by a section of magnetic material in which there is a flux change produced by a change of load current in said dynamoelectric machine, and means for maintaining a substantially constant flux condition in said section of said field magnet structure of said dynamoelectric machine, said means including a core of magnetic material having its magnetic circuit completed through said section of said field magnet structure and a winding on said core connected for energization in accordance with changes in load current in said dynamoelectric machine.

3. Apparatus comprising a dynamoelectric machine having a field magnet structure including pole pieces of laminated magnetic material connected by a section of solid magnetic material in which there is a flux change produced by a change of load current in said dynamoelectric machine, and means for maintaining a substantially constant flux condition in said solid section of said field magnet structure of said dynamoelectric machine, said means including a core of laminated magnetic material having its magnetic circuit completed through said solid section of said field magnet structure and a winding on said core connected for energization in accordance with changes in load current in said dynamoelectric machine.

4. Apparatus comprising a dynamoelectric machine having an armature, an armature winding and a field magnet structure in which its field flux changes in magnitude with changes in current in its armature winding, said field magnet structure including pole pieces of magnetic material distributed about said armature and connected by sections of magnetic material which completes the magnetic circuit through said pole pieces, and means for maintaining a substantially constant flux condition in a section of said field magnet structure between adjacent pole pieces of said dynamoelectric machine, said means including a core of magnetic material having its magnetic circuit completed through said section of said field magnet structure and a winding on said core connected for energization in accordance with changes in load current in the armature winding of said dynamoelectric machine.

5. Apparatus comprising a dynamoelectric machine having an armature, an armature winding and a magnetic field structure in which its field flux changes in magnitude with changes of current in its armature winding, said magnetic field structure including pole pieces of magnetic material distributed about said armature of said dynamoelectric machine and supported on a frame of magnetic material which completes the magnetic circuit through said pole pieces, and means for maintaining a substantially constant flux condition in said frame between adjacent pole pieces of said dynamoelectric machine, said means including a core of magnetic material having its magnetic circuit completed through said frame between said adjacent pole pieces of said dynamoelectric machine and a winding on said core connected for energization in accordance with changes in load current in the armature circuit of said dynamoelectric machine.

6. In combination, a dynamoelectric machine having an armature, an armature winding and pole pieces of magnetic material distributed about said armature and forming part of a frame of magnetic material which completes a magnetic circuit through said pole pieces and said armature, said dynamoelectric machine having on its said pole pieces series and shunt field windings which are connected and arranged for establishing a field flux in said pole pieces and said frame of said dynamoelectric machine which changes in magnitude with changes in load current in its said armature winding, and means for maintaining a substantially constant flux condition in said frame of said dynamoelectric machine between adjacent pole pieces thereof, said means including a core of magnetic material having its magnetic circuit completed through said frame of said dynamoelectric machine between said adjacent pole pieces thereof and a winding on said core connected in series circuit with said armature winding and said series field winding of said dynamoelectric machine.

7. In combination, a dynamoelectric machine having an armature, an armature winding and pole pieces of magnetic material distributed about said armature and forming part of a frame of magnetic material which completes a magnetic circuit through said pole pieces and said armature, said dynamoelectric machine having on its said pole pieces series and shunt field windings which are connected and arranged for establishing a field flux in said pole pieces and said frame of said dynamoelectric machine which changes in magnitude with changes in load current in its said armature winding, and means for maintaining a substantially constant flux condition in said frame of said dynamoelectric machine between adjacent pole pieces thereof, said means including a core of magnetic material having an air gap in its magnetic circuit and having its magnetic circuit completed through said frame of said dynamoelectric machine between said adjacent pole pieces thereof and a winding on said core connected in series circuit with said armature winding and said series field winding of said dynamoelectric machine.

8. A split pole dynamoelectric machine having a field magnet structure in which magnetic pole pieces of like and unlike polarity are connected by frame sections of magnetic material in which a flux change is produced by a change in load current in said dynamoelectric machine, and means for maintaining a substantially constant flux condition in one of said frame sections of said dynamoelectric machine, said means including a core of magnetic material having its magnetic circuit completed through said frame section and a winding on said core connected for energization in accordance with changes in load current in said dynamoelectric machine.

9. Apparatus comprising a dynamoelectric machine having an armature, an armature winding provided with a commutator, load brushes and an auxiliary brush intermediate said load brushes bearing on said commutator, a field magnet structure having two sets of field pole pieces distributed about said armature with pole pieces of the set intermediate pole pieces of the other set, one of said sets of pole pieces being saturated so that the flux in said set is substantially unaffected by armature reaction and produces a substantially constant voltage between said auxiliary brush and one of said load brushes and the other of said sets of pole pieces being unsaturated so that the flux therein is varied by armature reaction and produces a voltage between said load brushes which decreases when the load current increases, the voltage between the load brushes being equal to the algabraic sum of the voltages between said auxiliary brush and each of said load brushes, and an exciting winding for said saturated pole pieces connected between said auxiliary brush and one of said load brushes, said dynamoelectric machine forming part of a combination also including a reactor having its magnetic circuit completed through that portion of said field magnet structure of said dynamoelectric machine which is located between adjacent pole pieces thereof, and means for establishing a flux in said reactor for maintaining a substantially constant flux condition in said portion of said field magnet structure of said dynamoelectric machine between said adjacent pole pieces thereof, said means comprising a winding on said reactor connected for energization in accordance with changes in current flow in the armature winding of said dynamoelectric machine.

10. Apparatus comprising a dynamoelectric machine having an armature, an armature winding provided with a commutator, load brushes and an auxiliary brush intermediate said load brushes bearing on said commutator, a field magnet structure having two sets of field pole pieces distributed about said armature with pole pieces of one set intermediate pole pieces of the other set, one of said sets of pole pieces being saturated so that the flux in said set is substantially unaffected by armature reaction and produces a substantially constant voltage between said auxiliary brush and one of said load brushes and the other of said sets of pole pieces being unsaturated so that the flux therein is varied by the armature reaction and produces a voltage between said load brushes which decreases when the load current increases, the voltage between the load brushes being equal to the algebraic sum of the voltages between said auxiliary brush and each of said load brushes, and an exciting winding for said saturated pole pieces connected between said auxiliary brush and one of said load brushes, said dynamoelectric machine forming part of a combination also including a reactor having its magnetic circuit completed through that portion of said field magnet structure which is located between adjacent pole pieces of said dynamoelectric machine, and means for establishing through the magnetic circuit of said reactor a flux which maintains a substantially constant flux condition in that portion of said field magnet structure of said dynamoelectric machine between said adjacent pole pieces thereof, said means comprising a winding on said reactor connected in series circuit with said armature winding of said dynamoelectric machine.

11. Apparatus comprising a dynamoelectric machine having an armature, an armature winding provided with a commutator, load brushes and an auxiliary brush intermediate said load brushes bearing on said commutator, a field magnet structure having two sets of field pole pieces distributed about its inner periphery and about the outer periphery of said armature with pole pieces of one set intermediate pole pieces of the other set, one of said sets of pole pieces being saturated so that the flux therein is substantially unaffected by armature reaction and produces a substantially constant voltage between said auxiliary brush and one of said load brushes and the other of said sets of pole pieces being unsaturated so that the flux therein is varied by the armature reaction and produces a voltage between said load brushes which decreases when the load current through said armature winding increases, the voltage between said load brushes being equal to the algebraic sum of the voltages between said auxiliary brush and each of said load brushes, and an exciting winding for said saturated pole pieces connected between said auxiliary brush and one of said load brushes, said dynamoelectric machine forming part of a combination also including a reactor core spanning the outer periphery of said field magnet structure of said dynamoelectric machine between adjacent pole pieces thereof and having end portions spaced from said field magnet structure through which its magnetic circuit is completed, and a winding on said core connected in series circuit with said armature winding of said dynamoelectric machine for current flow therethrough in a direction to establish a substantially constant flux condition in said field magnet structure of said dynamoelectric machine between said adjacent pole pieces thereof irrespective of flux variations in said field magnet structure of said dynamoelectric machine resulting from changes in armature reaction with changes of load current flow through said armature winding of said dynamoelectric machine.

12. Apparatus comprising a dynamoelectric machine having an armature, an armature winding provided with a commutator, load brushes and an auxiliary brush intermediate said load brushes bearing on said commutator, a field magnet structure having two sets of field pole pieces distributed about its inner periphery and about the outer periphery of said armature with pole pieces of one set intermediate pole pieces of the other set, one of said sets of pole pieces being saturated so that the flux therein is substantially unaffected by armature reaction and produces a substantially constant voltage between said auxiliary brush and one of said load brushes and the other of said sets of pole pieces being unsaturated so that the flux therein is varied by armature reaction and produces a voltage between said load brushes which decreases when the load current through said armature winding increases, the voltage between said load brushes being equal to the algebraic sum of the voltages between said auxiliary brush and each of said load brushes, and an exciting winding for said saturated pole pieces connected between said auxiliary brush and one of said load brushes, said dynamoelectric machine forming part of a combination also including a reactor core spanning the outer periphery of said field magnet structure of said dynamoelectric machine between adjacent pole pieces thereof and having end portions spaced from said field magnet structure through which its magnetic circuit is completed, and a winding on said core connected in series circuit with said armature winding of said dynamoelectric machine for current flow therethrough in a direction to establish flux in said field magnet structure between said adjacent pole pieces thereof which is in the same direction as that produced by said exciting winding of said dynamoelectric machine, said reactor core and said winding thereon constituting means for maintaining a substantially constant flux condition in said field magnet structure of said dynamoelectric machine between said adjacent pole pieces thereof irrespective of flux variations in said field magnet structure of said dynamoelectric machine resulting from changes in armature reaction with changes of load current flow through said armature winding of said dynamoelectric machine.

13. Apparatus comprising a dynamoelectric machine having an armature, an armature winding provided with a commutator, load brushes and an auxiliary brush bearing on said commutator, a field magnet structure having two sets of field pole pieces, one of said sets of pole pieces being saturated so that the flux in said set is substantially unaffected by armature reaction and produces a substantially constant voltage between said auxiliary brush and one of said load brushes and the other of said sets of pole pieces being unsaturated so that the flux therein is varied by armature reaction so that the voltage produced between said load brushes decreases when the load current in said armature winding increases, the voltage between said load brushes being equal to the algebraic sum of the voltages between said auxiliary brush and each of said load brushes, field windings for all of said pole pieces connected between said auxiliary brush and one of said load brushes and across that portion of the armature which has a voltage induced therein by the saturated pole pieces, the field windings on said unsaturated pole pieces being arranged to set up a flux in an opposite direction to the flux produced in said pole pieces by armature reaction, and other field windings on said unsaturated pole pieces connected in series wtih said armature winding and wound differentially with respect to first mentioned field windings, said dynamoelectric machine forming part of a combination also including a reactor core spanning the outer periphery of said field magnet structure of said dynamoelectric machine between adjacent pole pieces thereof and having end portions spaced from said field magnet structure through which its magnetic circuit is completed, and a winding on said core connected in series circuit with said armature winding and said series field windings of said dynamoelectric machine for current flow therethrough in a direction to establish a substantially constant flux condition in said field magnet structure of said dynamoelectric machine between said adjacent pole pieces thereof irrespective of flux variations in said field magnet structure of said dynamoelectric machine resulting from changes in armature reaction and series field excitation with changes of load current flow through said armature winding and said series field windings of said dynamoelectric machine.

CHARLES M. WHEELER.